United States Patent
Ishii et al.

(10) Patent No.: US 8,734,278 B2
(45) Date of Patent: May 27, 2014

(54) RACHET-TYPE TENSIONER

(75) Inventors: Akira Ishii, Osaka (JP); Munehiro Maeda, Osaka (JP); Osamu Yoshida, Osaka (JP); Yuji Kurematsu, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 187 days.

(21) Appl. No.: 13/401,160

(22) Filed: Feb. 21, 2012

(65) Prior Publication Data

US 2012/0225743 A1 Sep. 6, 2012

(30) Foreign Application Priority Data

Mar. 1, 2011 (JP) ................. 2011-044378

(51) Int. Cl.
*F16H 7/08* (2006.01)
(52) U.S. Cl.
USPC .......................... 474/110; 474/111
(58) Field of Classification Search
USPC .......................... 474/109, 110, 111
See application file for complete search history.

(56) References Cited

U.S. PATENT DOCUMENTS

| | | | |
|---|---|---|---|
| 2003/0236144 A1* | 12/2003 | Seungpyo | 474/110 |
| 2004/0204272 A1* | 10/2004 | Seungpyo et al. | 474/109 |
| 2005/0239589 A1* | 10/2005 | Seungpyo et al. | 474/110 |
| 2007/0243961 A1* | 10/2007 | Aimone | 474/109 |
| 2012/0196709 A1 | 8/2012 | Kurematsu | |
| 2012/0244975 A1 | 9/2012 | Kurematsu | |

FOREIGN PATENT DOCUMENTS

| | | |
|---|---|---|
| JP | 2559664 | 9/1997 |
| JP | 2004-036779 | 2/2004 |

OTHER PUBLICATIONS

Unpublished U.S. Appl. No. 13/474,792 for Ratchet-Type Tensioner.
Unpublished U.S. Appl. No. 13/477,345 for Ratchet-Type Tensioner.

* cited by examiner

*Primary Examiner* — William E Dondero
*Assistant Examiner* — Diem Tran
(74) *Attorney, Agent, or Firm* — Howson & Howson LLP

(57) ABSTRACT

A ratchet-type tensioner capable of restricting setback of a plunger includes a ratchet mechanism that allows setback of the plunger by sliding a ratchet element in a disengaging direction to disengage ratchet teeth from rack teeth when a reaction force acts on the plunger as a result of excessive chain tension. The ratchet element is slidable in a ratchet-receiving hole, and an inclination suppressing structure that prevents the ratchet element from becoming skewed in the ratchet receiving hole to an extent such that its forward end contacts one side of the hole while its rearward end contacts the opposite sides of the hole.

2 Claims, 14 Drawing Sheets

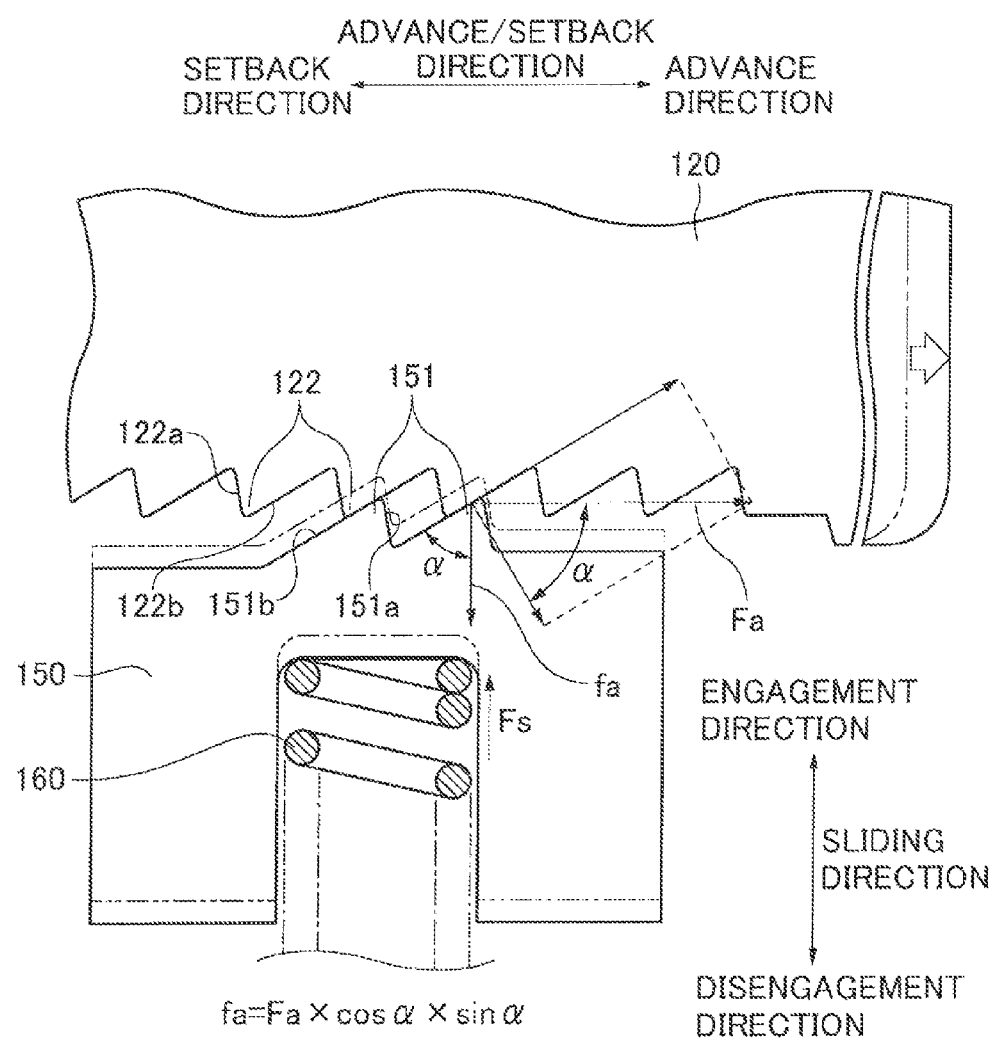

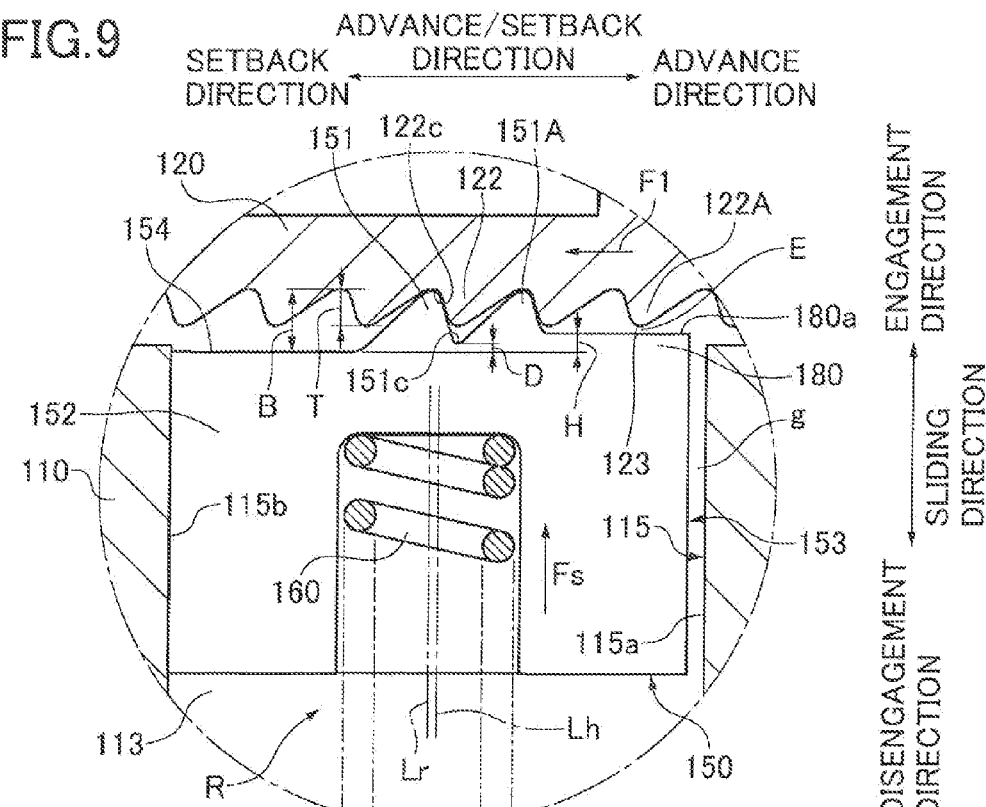
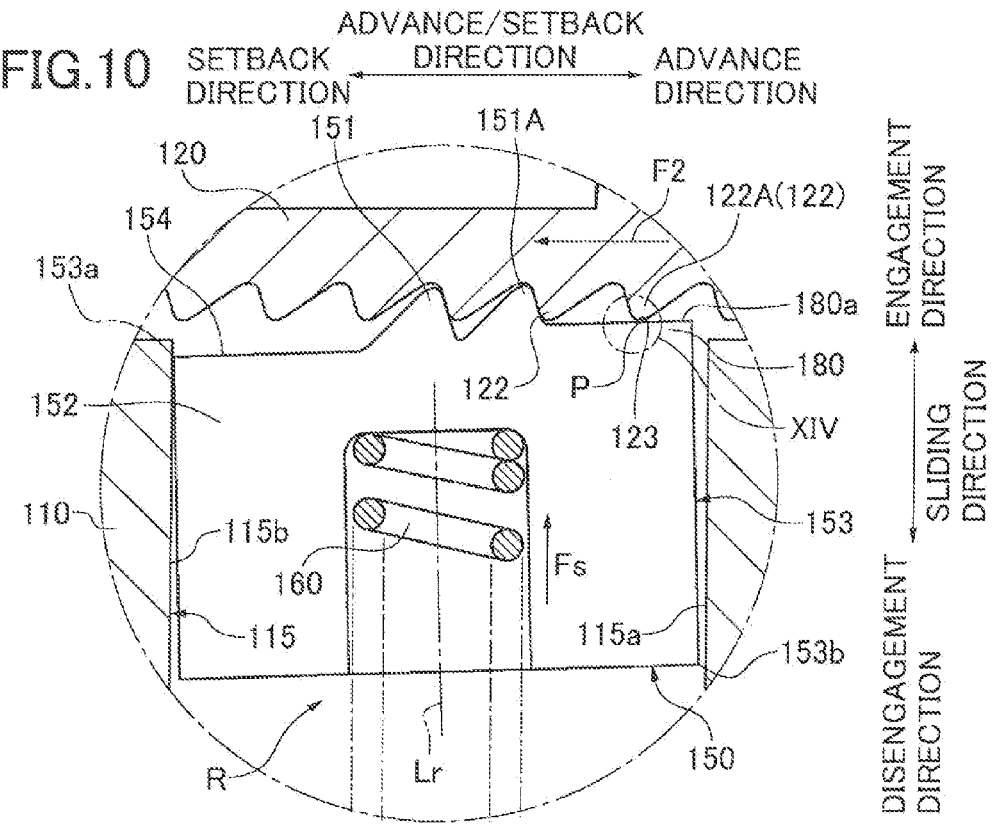

RACHET-TYPE TENSIONER

CROSS REFERENCE TO RELATED APPLICATIONS

This application claims priority from Japanese Patent Application No. 2011-044378, filed on Mar. 1, 2011. The disclosure of Japanese Patent Application No. 2011-044378 is incorporated by reference.

FIELD OF THE INVENTION

The invention relates to a ratchet-type tensioner for applying tension to an endless, flexible, transmission medium such as a timing chain or timing belt engaged with sprockets or similar rotating members to transmit power. A ratchet-type tensioner can be used, for example, to maintain tension in a timing chain used to drive camshafts and other components of an internal combustion engine.

BACKGROUND OF THE INVENTION

A typical ratchet-type tensioner includes a plunger slidable in a plunger-accommodating hole in a tensioner housing. The plunger is biased in its advancing, i.e., protruding, direction, and abuts a flexible transmission medium directly, pr through a device such as a pivoted tensioner lever, to apply tension to the transmission medium.

A typical prior art ratchet-type tensioner 500 is disclosed in Japanese Utility Model No. 2559664 and illustrated in FIG. 15. In the tensioner, a plunger 514 is slidable in a plunger-accommodating hole in a housing 512, and protrudes from the housing, being biased in the advancing direction by a spring 518 and by oil pressure within a chamber 516 formed by the plunger and the housing.

A piston 526 slides in the housing 512 in a direction orthogonal to the direction in which the plunger 514 slides. An oil sub-chamber 520 is formed by the piston 526 and the housing 512, and an oil passage 544 supplies oil under pressure to the oil sub-chamber 520, urging the piston away from the plunger 514. A spring 534 biases the piston 526 toward plunger, opposing the force exerted by the oil in sub-chamber 520. Spring 534 is located within an air chamber 528 on the side of piston 526 opposite from the sub-chamber 520. An air hole 532 in communication with the air chamber 528 is closable by a rod 524, to which the piston 526 is attached, when the piston 526 is moved away from the plunger against the biasing force exerted by spring 534.

A rack of teeth 538 is provided on the plunger 514, and a plurality of teeth 536 capable of engaging the rack teeth 538 is provided at an end of rod 524 opposite form the end that is arranged to close off air hole 532. Surfaces of teeth 536 and 538 for blocking retraction of the plunger are formed at a right angle to a direction in which the plunger 514 moves.

In ratchet-type tensioners of the kind shown in FIG. 15, it is also known to provide cooperating surfaces for guiding the sliding movement of the ratchet element corresponding to rod 524 and piston 526.

If the plunger of the tensioner advances excessively when a timing chain becomes loose due to elongation as a result of fluctuations in tension or thermal expansion caused by changes in engine temperature, the restriction on retraction of the plunger due to operation of the ratchet mechanism can result in prolonged operation of the chain under excessive tension, which can result in noise as well as excessive forces that can shorten the useful life of the chain.

Japanese laid-open Patent Application No. 2004-36779 describes a tensioner designed to prevent a transmission chain from traveling under excessive tension. The tensioner has plunger having cut-away grooves and a spring-biased ball detent that engages a groove. The mechanism allows setting back, i.e., retraction, of the plunger when the chain is under excessive tension.

A ratchet mechanism that permits the plunger to set back when the tension of the chain is excessive can also be realized in a structure comprising rack teeth on the plunger, and cooperating teeth on a ratchet element that slides in a housing laterally relative to the direction of movement of the plunger. In this mechanism, the plunger is quickly set back by sliding of the ratchet element in a direction such that its teeth disengage the rack teeth, and excessive tension in the chain is reduced quickly. However, the reaction force imparted to the plunger as a result of excessive tension in the chain can cause the ratchet element to become inclined slightly relative to its sliding direction. When the ratchet element is inclined, both ends of the surface that is normally in sliding contact with a guide surface in the housing come into point contact with the guide surface. When point contact occurs, the slidability of the ratchet element relative to the guide surface is compromised, and the ratchet element no longer moves smoothly in the direction in which its teeth disengage the rack teeth.

In the tensioner shown in FIG. 15 and disclosed in Japanese Utility Model No. 2559664, the plunger is biased in the advancing direction by a plunger-biasing spring and by hydraulic pressure from oil supplied from an external source to the high-pressure oil chamber formed between the housing and the plunger. In this tensioner, there is also a problem that, on starting the engine, the hydraulic pressure in the tensioner can be insufficient to prevent setback of the plunger because of entry of air into the high pressure oil chamber while the engine is stopped. When the engine is started, the plunger is set back immediately by a reaction force from the chain, causing rattling sounds, referred to sometimes as "flapping noises,"

SUMMARY OF THE INVENTION

The invention aims at solving the aforementioned problems by providing a ratchet-type tensioner capable of restricting setback of a plunger by engaging rack teeth on the plunger by ratchet teeth of a ratchet member slidable in the tensioner housing, wherein the plunger is allowed to set back quickly when the tension of the transmission medium is excessive, thus reducing the load and noise of the transmission medium caused by the excessive tension.

The invention also aims at preventing the plunger from setting back when hydraulic pressure within the high-pressure oil chamber is too low to counteract the reaction force exerted by the transmission medium, thereby reducing the noise caused by the setback of the plunger.

The ratchet-type tensioner in accordance with the invention comprises a housing, and a plunger supported by the housing for movement in an advance/setback direction. Rack teeth are provided on the plunger and arranged to advance with respect to the housing along the advance/setback direction for applying tension to a traveling transmission medium engaged with rotating members. The tensioner includes a ratchet mechanism capable of restricting the plunger from setting back due to a reaction force acting in a setback direction from the transmission medium. The ratchet mechanism comprises a ratchet-receiving hole provided within the housing, a ratchet element slidable in the ratchet-receiving hole and movable in a sliding direction transverse to the advance/ setback direction, ratchet teeth on the ratchet element engageable with the rack teeth of the plunger, and a ratchet-biasing spring for biasing the ratchet element in an engaging direction along the sliding direction so that the ratchet teeth engage with the rack teeth. The ratchet mechanism restricts the plunger from setting back by engaging the ratchet teeth with the rack teeth when the reaction force is a first reaction force generated when the tension of the transmission medium is smaller than a predetermined excessive tension. However, the ratchet mechanism allows the plunger to set back by sliding the ratchet element in a disengaging direction to disengage the ratchet teeth from the rack teeth when the reaction force is a second reaction force generated when the tension of the transmission medium at least as great as the predetermined excessive tension. The ratchet-receiving hole has a guide surface for guiding the ratchet element in the sliding direction by sliding contact with a sliding surface of the ratchet element. The ratchet mechanism further comprises an inclination suppressing structure for preventing the sliding surface of the ratchet element from contacting the advance direction-side part of the guide surface when the ratchet element is pressed by the plunger in the setting back direction due to the second reaction force.

The ratchet element slides smoothly in the disengaging direction with respect to the guide surface, and the slidability of the ratchet element in the disengaging direction is improved as compared to the case when the ratchet element is forced into a skewed condition such that its opposite ends contact opposite sides of the ratchet-receiving hole.

Because the prevention of the above-described contact condition is brought about when the ratchet element starts to slide in the disengaging direction immediately after the plunger starts to press the ratchet element in the setback direction, it becomes possible to avoid the effects of static friction acting on the ratchet element. As a result, the ratchet teeth are disengaged quickly from the rack teeth, the plunger can be quickly set back, and the excessive tension of the transmission medium can be eliminated quickly, so that it becomes possible to reduce the load on the transmission medium and to reduce the noise caused by excessive tension.

In another aspect of the invention, the inclination suppressing structure is a stop provided on one of the ratchet element and a member other than the ratchet element. The stop is located for abutment with the other of said ratchet element and said member at an abutment position. The abutment position is located on the advance direction-side of an axial center line of the ratchet element and on the advance direction side of the ratchet tooth of the ratchet element which is the frontmost tooth thereof with reference to the advancing direction of the plunger.

Because the inclination suppressing structure is formed by a stop that is provided on one member, suppression of inclination of the ratchet element can be realized with a simple structure.

It is also possible to increase the sliding range of the ratchet element in which contact of the ends of the ratchet element with opposite sides of the guide due to inclination is prevented.

As a result, because the inclination suppressing sliding range that improves the slidability of the ratchet element in the disengaging direction is enlarged, it becomes possible to improve the rapidity of the setback of the plunger, and the rapidity with which excessive tension in the transmission medium is relieved, and to reduce the load of the transmission medium and the noise caused by excessive tension.

In still another aspect, the stop is a projection on the ratchet element that is positioned for abutment with a tip or a tooth surface of a rack tooth. It is thus possible to prevent the ratchet element from inclining as the stop abuts a rack tooth of the plunger, and to realize the inclination suppressing structure in a simple manner by utilizing a rack tooth.

In the case in which the stop abuts a tooth tip of the rack tooth, the shape of the stop can be very simple and the stop can be formed easily.

In the case of abutment of the stop with a tooth surface of the rack tooth, the abutment position is located between the tooth bottom and the tooth tip of the rack tooth, so that the inclination suppressing sliding range can be greater than in the case of abutment of the stop with the tip of a rack tooth.

In accordance with still another aspect of the invention, when the ratchet element projects farthest in the engaging direction and the rack teeth are in mesh with the ratchet teeth, the height H of the projection, measured between the plunger-side end surface of the ratchet element and the abutment position, the tooth depth T of the rack teeth and the gap B between the tooth bottoms of the rack teeth and the plunger-side end surface of the ratchet element are related by $H<B-T$.

A gap is created in the sliding direction between the tooth tip of the rack tooth and the stop when the ratchet element is at its maximum projecting position in the engagement direction, and it is possible to prevent the projection from hampering movement of the plunger in the advance/setback direction. It is possible to improve rapidity of the setback of the plunger by the inclination suppressing effect brought about by the projection while ensuring good mobility of the plunger in the advance/setback direction.

In still another aspect of the invention, the height H of the projection and the distance D between the tooth bottoms of the ratchet teeth and the plunger-side end surface of the ratchet element are related by $H>D$. As a result, it is not necessary to abut the tooth bottom of the ratchet element with the tooth tip of the rack teeth to suppress inclination of the ratchet element, and it is possible to prevent wear the tooth bottom of the ratchet element and the tooth tip of the rack tooth that would otherwise occur.

In another aspect, the biasing force of the ratchet biasing spring for biasing the ratchet element in the engaging direction is greater than a first component force in the sliding direction generated by the first reaction force and smaller than a second component force in the sliding direction generated by the second reaction force.

As a result, it becomes possible to reduce flapping noise of a timing chain by restricting the movement of the plunger in the setback direction, thereby blocking setback displacement.

The biasing force of the plunger biasing means can be just enough bias the plunger in the advancing direction. Accordingly, no special plunger-biasing spring for accommodating a high load is required, the tensioner can be downsized, and the number of parts and manufacturing costs can be reduced.

Because the biasing force of the ratchet-biasing means is smaller than the second component force in the sliding direction of the ratchet element generated by the second reaction force that sets back the plunger when the tension of the timing chain is excessive, the second component force acts on the ratchet teeth of the ratchet element when the tension is excessive, and the ratchet teeth of the ratchet element are disengaged from the rack teeth of the plunger. Then, the plunger is set back until the biasing force of the ratchet biasing means becomes greater than the second component force. Thus, it is possible to prevent seizing of the plunger by allowing the setback displacement without restricting movement of the plunger in the setback direction, which could cause backlash. It is also possible to prevent seizing of the plunger because the timing of disengagement caused by excessive tension can be adjusted by adjusting the biasing force of the ratchet biasing means.

In still another aspect, the rack teeth of the plunger are concave/convex teeth having stop surfaces inclined toward the advance-direction side, proceeding in the disengagement direction and sliding surfaces inclined toward the setback-direction side, proceeding in the disengagement direction, and the ratchet teeth of the ratchet element are concave/convex teeth having stop counterface surfaces inclined toward the advance-direction side, proceeding in the disengagement direction and sliding counterface surfaces inclined toward the setback-direction side, proceeding in the disengagement direction.

When the second reaction force that sets back the plunger when tension is excessive is generated, the reaction force acts on the stop surfaces of the ratchet element as the component force through the stop surfaces on the plunder side. The component force that acts on the stop counterface surfaces of the ratchet element acts further as the smaller component force in the sliding direction of the ratchet element so as to disengage the ratchet teeth of the ratchet element from the rack teeth of the plunger.

The rack teeth of the plunger slide over the counterface surfaces through the stop counterface surface and return by one tooth, so that it becomes possible to achieve smooth setback displacement without restricting the movement of the plunger in the setback direction while preventing wear and damage such as chipping of the ratchet teeth and the rack teeth when the tension is excessive and to exhibit excellent durability by avoiding excessive impact on the ratchet biasing spring.

In still another aspect, the inclination angle of the stop surfaces is smaller than the inclination angle of the sliding surfaces. It becomes possible to block the plunger from setting back during ordinary engine operation, even when the first reaction force that sets back the plunger on engine starting is generated, because the disengagement of the rack teeth of the plunger and the ratchet teeth of the ratchet is blocked.

Finally in accordance with another aspect of the invention, the housing is attached to an engine that rotates the rotating members, the plunger biasing means includes oil supplied under pressure during operation of the engine to a high-pressure oil chamber formed within the tensioner housing. The first reaction force includes the reaction force generated on starting the engine, and the second reaction force includes a reaction force generated after starting the engine.

When the second reaction force that sets back the plunger is generated when the tension becomes excessive after starting the engine, the ratchet-type tensioner allows setback of the plunger, so that it becomes possible to reduce the excessive tension quickly.

BRIEF DESCRIPTION OF DRAWINGS

FIG. 3 is a schematic diagram showing the engagement of rack teeth on the plunger with ratchet teeth when the plunger is advancing;

FIG. 9 is a cross-sectional view showing details of the relationship between the ratchet element and the plunger rack when the plunger is blocked from setting back on starting the engine;

FIG. 10 is a cross-sectional view showing details of the relationship between the ratchet element and the plunger rack as the plunger begins to set back when tension in a timing chain becomes excessive;

DETAILED DESCRIPTION OF THE PREFERRED EMBODIMENTS

Figure 1:
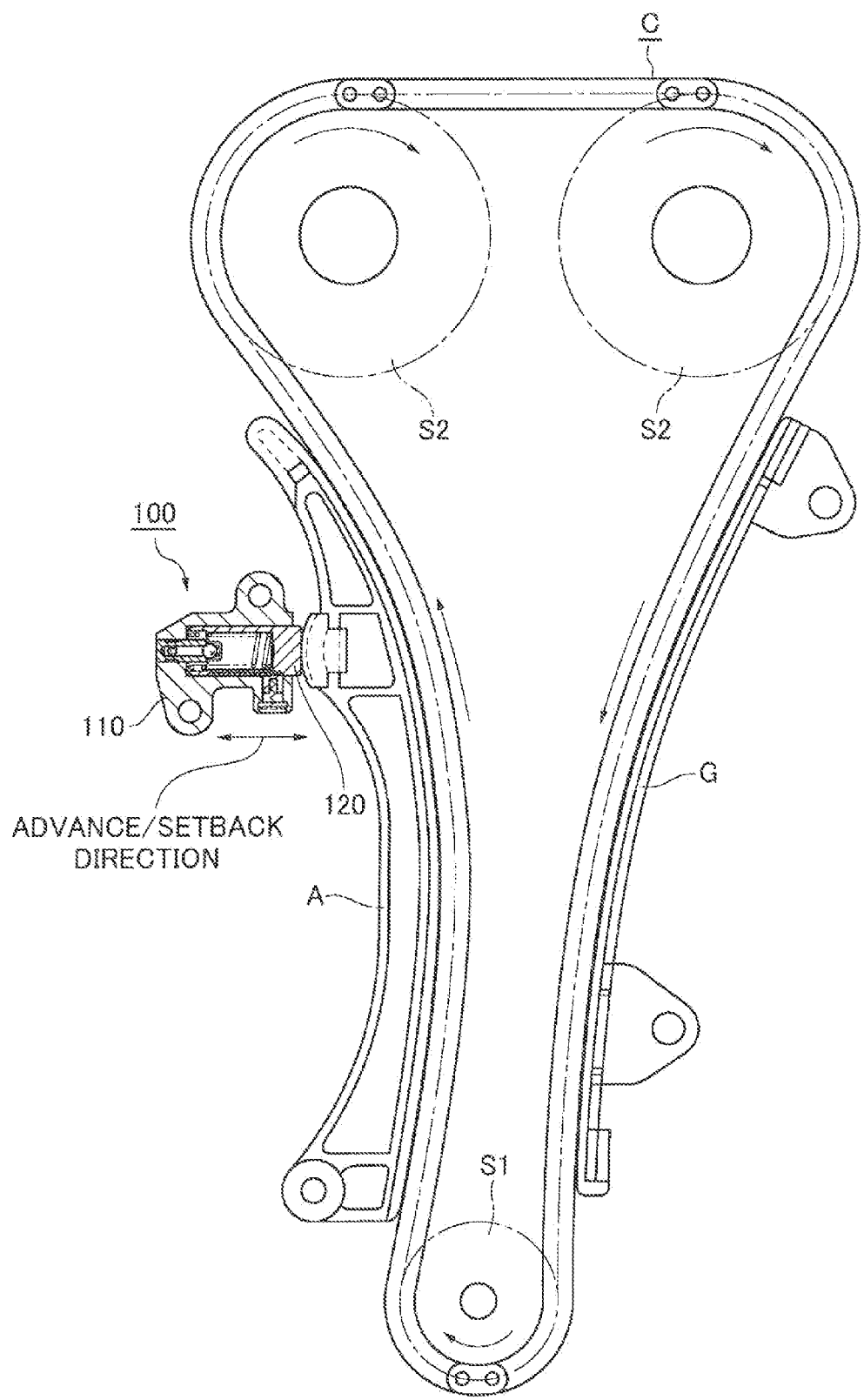
FIG. 1 is a schematic elevational view of an engine timing transmission incorporating of a ratchet-type tensioner in accordance with the invention.

The ratchet-type tensioner 100 in FIG. 1 is attached to an engine block (not shown) adjacent the slack side of the endless engine timing chain C, i.e., the span of the timing chain that travels from the engine crankshaft sprocket S1 toward one of two engine camshaft sprockets S2.

The tensioner 100 has a housing 110 and a plunger 120 that projects out of the housing and is movable in an advancing direction toward the chain and in a setback, or retracting, direction away from the chain. The plunger 120 applies tension to the slack side of the chain through a movable lever A on which the chain slides. The lever is pivotably supported on the engine block, and is in sliding engagement with the part of the chain on the outside of the loop formed by the chain.

A stationary guide G is in engagement with the tension side of chain C, i.e., the span that travels from one of the camshaft sprockets S2 toward the crankshaft sprocket S1. This guide G is also in sliding engagement with the part of the chain on the outside of the loop. Arrows in FIG. 1 indicate the direction of rotation of the sprockets and the direction of movement of the chain.

Figure 2A:
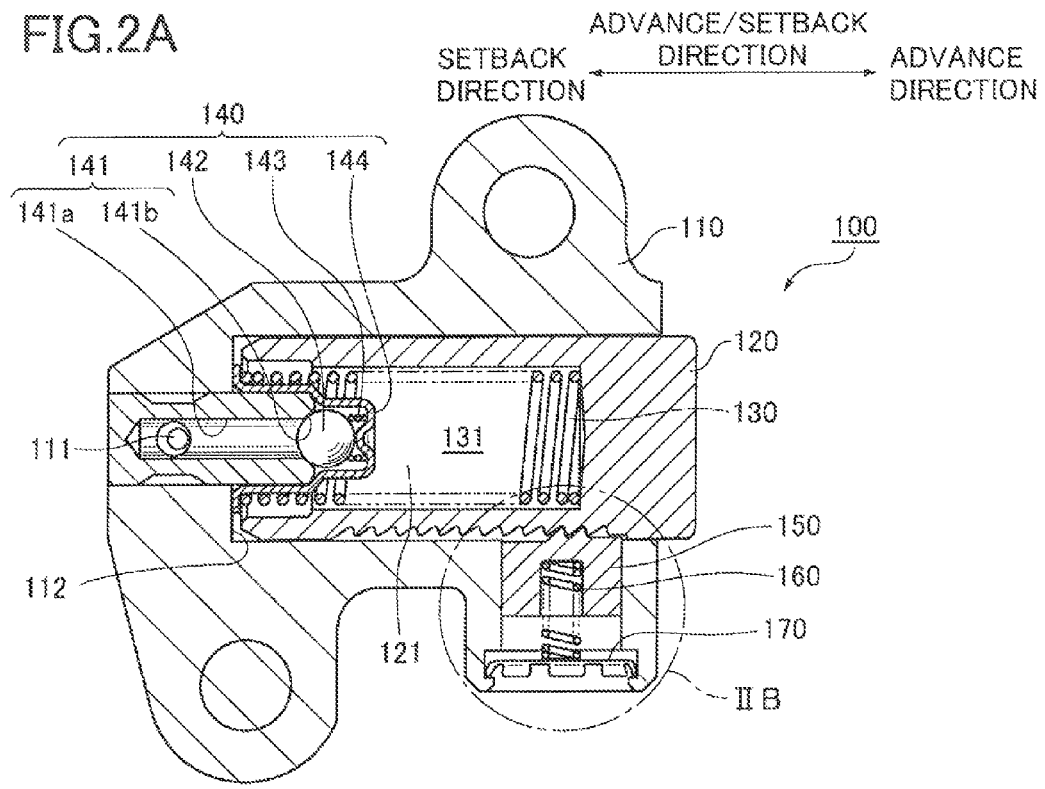
FIG. 2A is longitudinal cross-section of a ratchet-type tensioner according to the invention.
Figure 2B:
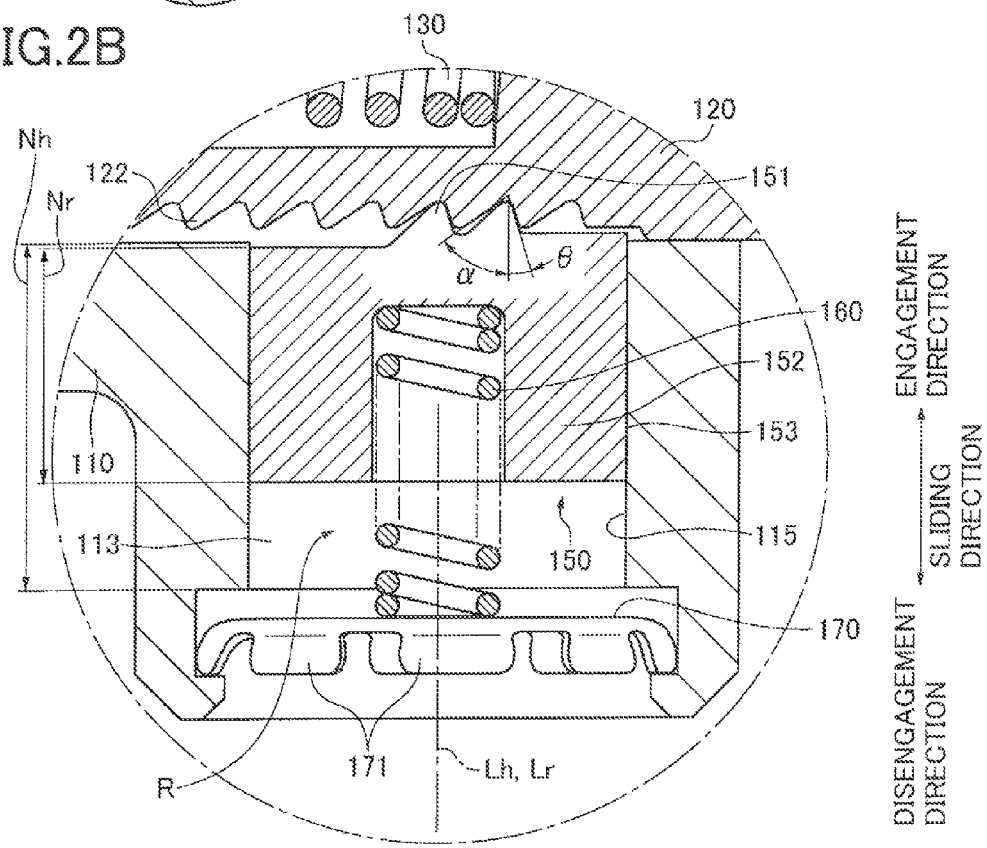
FIG. 2B is an enlarged auxiliary view of a part of the tensioner surrounded by a broken line circle in FIG. 2A.

As shown in FIG. 2, an oil supply passage 111 is formed in the tensioner housing 110 for introducing engine oil, supplied under pressure from the engine block, into the tensioner 100. A hollow plunger 120 is slidable in a plunger-accommodating hole 112 and is reciprocable in the advancing and setback direction indicated in FIG. 2A. The plunger protrudes out of the plunger-accommodating hole 112 to apply tension to the timing chain. A high-pressure oil chamber 131 is formed by the plunger-accommodating hole 112 in the housing 110 and an internal space 121 inside the plunger 120. A plunger-biasing spring 130 is disposed in the high-pressure oil chamber 131, and exerts a force biasing the plunger 120 in the advancing direction. A check valve assembly 140 in the plunger-accommodating hole 112 block reverse flow of oil from the high-pressure oil chamber 131 through the oil supply passage 111. A ratchet mechanism R (FIG. 2B) restricts movement of the plunger 120 in the setback direction when a reaction force is applied by the timing chain to the plunger through the tensioner lever A (FIG. 1).

Oil, supplied under pressure from an external source such as an engine oil pump, is introduced into the high-pressure oil chamber 131 through the oil supply passage 111. The pump is activated when the engine is in operation and deactivated when the engine is out of operation. Therefore, the pressure of the oil supplied to the high pressure oil chamber 131 of the tensioner depends on the operation of the engine.

The plunger-biasing spring 130 and the pressure of the oil within the high-pressure oil chamber 131 cooperatively bias the plunger 120 in the advancing direction.

The ratchet mechanism R includes a hole 113 within the housing 110, in which a ratchet element 150 is slidable in a sliding direction as indicated in FIG. 2B. The ratchet element is provided with a plurality of ratchet teeth 151, which are engageable with rack teeth 122 provided on a part of an outer circumferential surface of the plunger 120. A ratchet-biasing spring 160 urges the ratchet element 150 in the engaging direction, i.e., the direction in which the ratchet teeth 151 engage the rack teeth 122. The spring 160 is seated on a plug 170 fitted within the ratchet element-receiving hole 113.

The ratchet element 150 has a columnar shape and has a outer circumferential surface 153. Its ratchet teeth 151 are formed on the plunger-facing end of the ratchet element 150.

The ratchet element 150 is constrained to slide in a direction transverse to, and preferably orthogonal to, the advance/setback direction of the plunger 120. The engagement direction is the direction in which the ratchet element 150 slides when its ratchet teeth 151 engage the rack teeth 122, i.e., the direction in which the ratchet element 150 approaches the plunger 120. The disengagement direction is the sliding direction of the ratchet element opposite from the engagement direction, when the ratchet teeth 151 disengage the rack teeth 122, i.e., the direction in which the ratchet element 150 recedes from the plunger 120.

Radial and circumferential directions of the ratchet element 150 are defined respectively in relation to an axial center line Lr of the ratchet element 150 as shown in FIG. 2B, the center axial line being along the axis of the outer circumferential surface 153 of the ratchet element 150.

FIGS. 2A and 2B show the ratchet element 150 positioned concentrically with an inner circumferential surface 115 of the ratchet element-receiving hole 113, which has an axial center line Lh. Thus, center lines Lr and Lh coincide.

The term "plunger side" refers to positions closer to the plunger 120 in the sliding direction and the term "non-plunger side" refers to positions farther from the plunger 120 in the sliding direction, i.e., the side opposite from the plunger side. Similarly, the term "advance direction side" refers to positions locate in relation to the plunger on the side thereof in which the plunger advances, and the term "set back direction side" refers to positions locate in relation to the plunger on the side in which the plunger sets back.

The check valve unit 140 can be any known type of check valve as long as it is located on the setback direction side of the plunger-accommodating hole 112, allows oil to be introduced through the oil supply path 111 to the high-pressure oil chamber 131, and blocks reverse flow of oil from the high-pressure oil chamber 131 through the oil supply passage 111.

In the embodiment shown in FIG. 2A, the check valve unit 140 includes a ball seat 141 having an oil passage 141a in communication with the oil supply path 111, a check ball 142 seated on a flared end 141b of the ball seat 141, a ball-biasing spring 143 for biasing the check ball 142 toward the ball seat 141, and a bell-shaped retainer 144 for supporting the ball biasing spring 143 and restricting movement of the check ball 142.

The ratchet-biasing spring 160 is inserted within a spring-receiving hole 152a in ratchet element 150 and is disposed coaxially with the ratchet element 150 along the sliding direction.

The plug 170 is a stopping washer having a plurality of resilient tongues 171 projecting from its perimeter. The plug is fitted into the non-plunger side end of the hole 113, and is held in place by the engagement of the tongues with the wall 115 of the hole. The location of the plug 170 also defines the biasing force Fs applied to the ratchet element by the ratchet-biasing spring 160 (see FIGS. 3 through 5).

The mutual relationship of the rack teeth 122, the ratchet teeth 151, and the ratchet biasing spring 160, will be described mainly with reference to FIGS. 3 through 5, and to FIGS. 1, 2A and 2B as necessary.

As shown in FIG. 3, the plunger 120 is caused to advance by an advancing force Fa applied to the plunger 120 by the plunger biasing spring 130 (FIG. 2A) and by the oil pressure within the high-pressure oil chamber 131 during normal engine operation when the tension in the timing chain C is not excessive. The biasing force Fs applied by the ratchet-biasing spring 160 is set so that it its magnitude is always less than the magnitude of the force component fa of the advancing force Fa, component fa acting on the ratchet element in the disengaging direction by the action of the rack teeth 122 of the plunger on ratchet teeth 151.

If the component force fa surpasses the resultant of the biasing force Fs and the sliding direction component of the frictional force between the rack teeth 122 and the ratchet teeth 151, the ratchet element 150 will be pushed in the disengagement direction sufficiently that its teeth will momentarily disengage the rack teeth on the plunger 120, and the plunger will advance, pushing lever A (FIG. 1) against chain C. FIG. 3 shows the front end of the plunger 120 in a partially advanced position in a solid line, and also shows the position of the front end of the plunger before advancing movement begins by a two-dot chain line.

Figure 4:
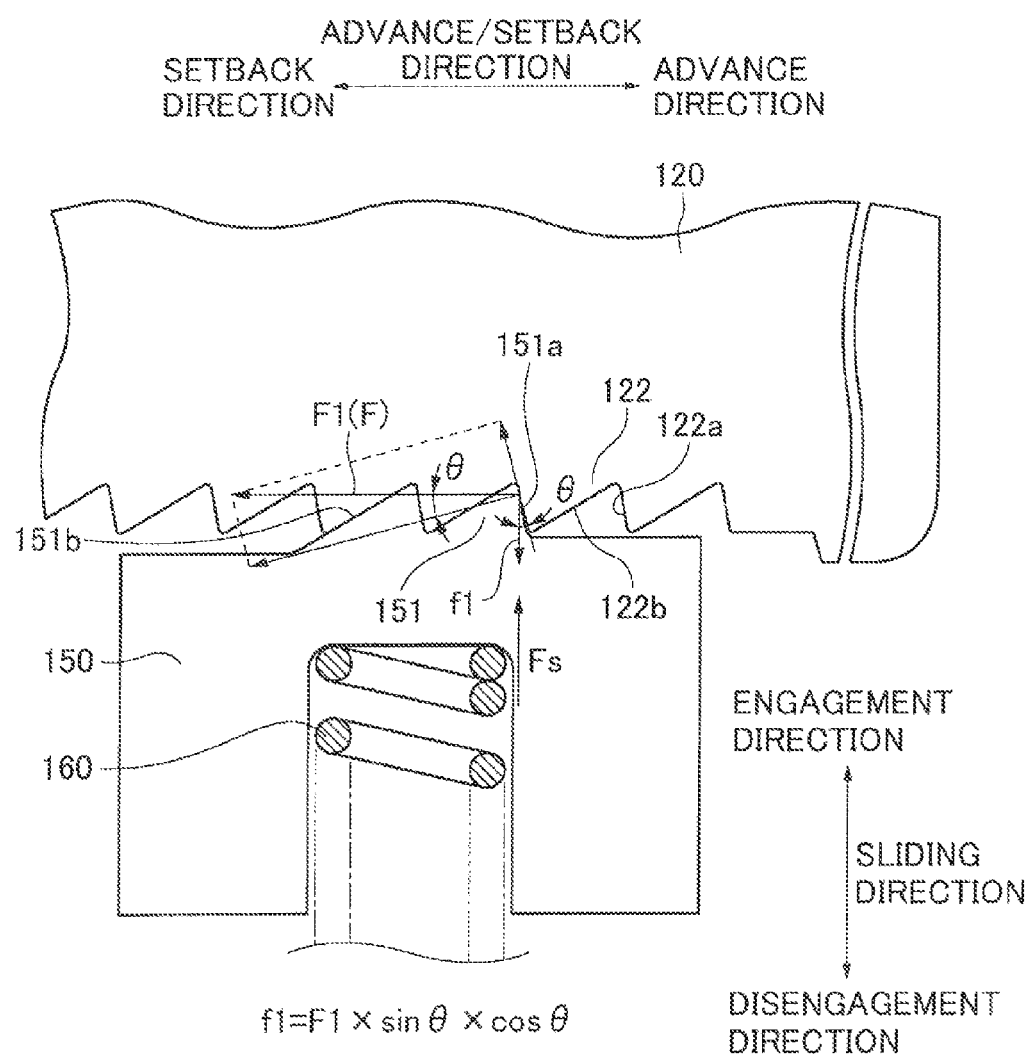
FIG. 4 is a schematic diagram showing the engagement of rack teeth on the plunger with ratchet teeth when the plunger is blocked from setting back on starting an engine.

FIG. 4 depicts a condition in which the hydraulic pressure in oil chamber 131 is at a level corresponding to normal engine operation after the engine has been started. A reaction force F, applied by the timing chain C through lever A, urges the plunger 120 in the setback direction. In FIG. 4, the magnitude of this reaction force F is a first magnitude F1, and its component f1, acts on the ratchet element though the action of the rack teeth 122 on the ratchet teeth 151. The magnitude of the biasing force Fs is set so that it is greater than the magnitude of component f1.

Even on starting of the engine, when, due to infiltration of air into the high-pressure oil chamber 131 while the engine is stopped, there is not enough hydraulic pressure to counteract the first reaction force F1, the magnitude of the biasing force Fs is still greater than the magnitude of force component f1 which acts on the ratchet element 150. The engagement of the ratchet teeth 151 with the rack teeth 122 therefore blocks setback of the plunger so that, on starting of the engine, the setback of the plunger 120 is limited to its backlash.

Figure 5:
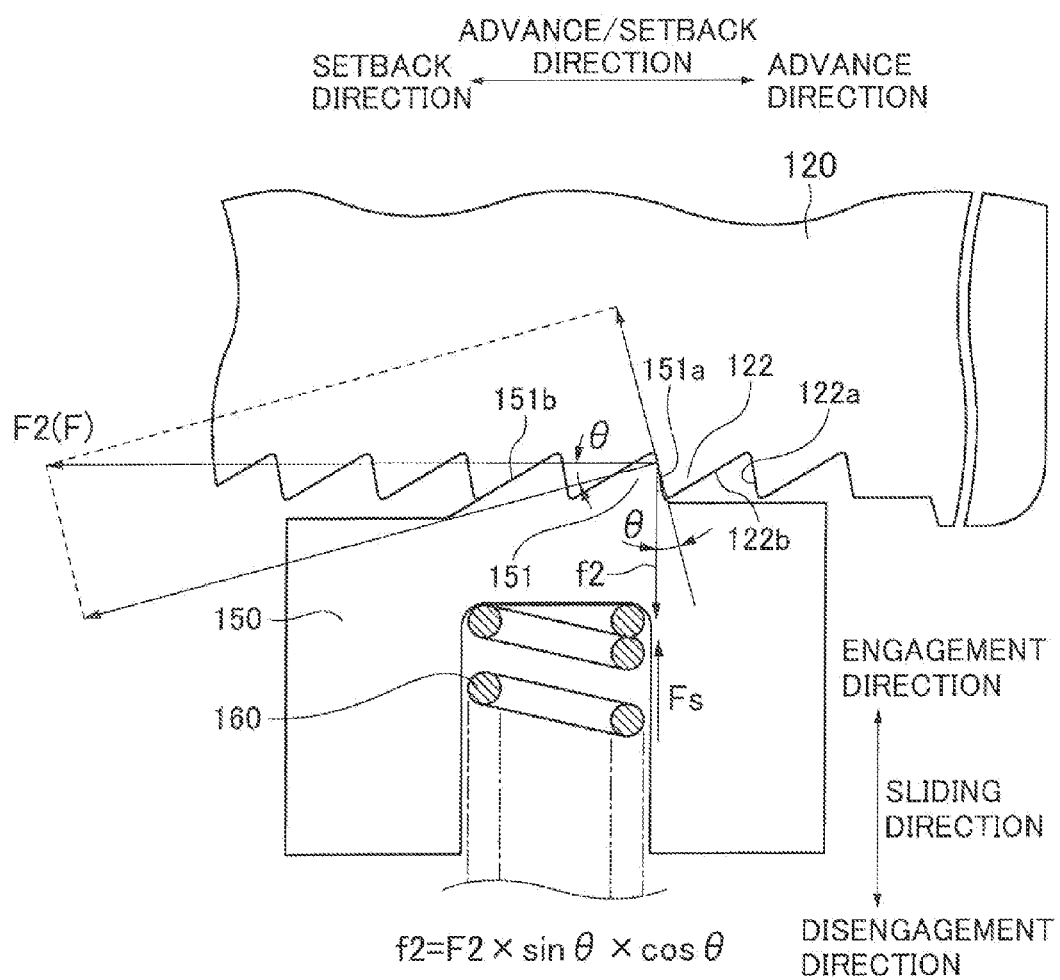
FIG. 5 is a schematic diagram showing the engagement of rack teeth on the plunger with ratchet teeth as the plunger begins to set back when tension in a timing chain becomes excessive.

In FIG. 5, the reaction force F has a larger magnitude F2, resulting from excessive tension in the timing chain C, which can be generated if plunger 120 advances excessively due to elongation of the timing chain C, thermal expansion of the engine block due to temperature changes, or various other causes. The component f2 acts on the ratchet element in the disengagement direction, through the action of the rack teeth 122 on the ratchet teeth 151. The biasing force Fs, acting on the ratchet element, is set so that its magnitude is smaller than the magnitude of the force component f2 in the disengagement direction.

Figure 6:
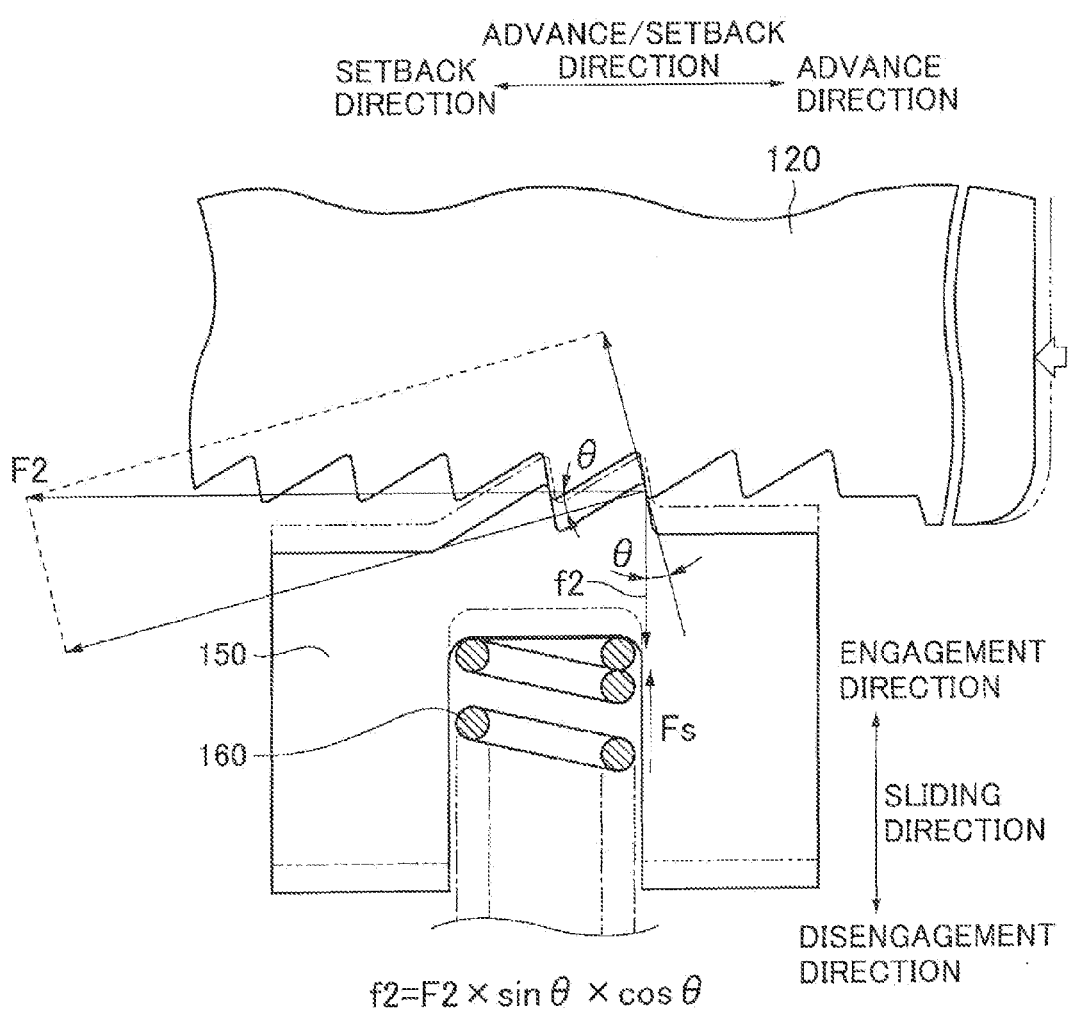
FIG. 6 is a schematic diagram showing the engagement of rack teeth on the plunger with ratchet teeth as the plunger continues to set back while the tension in the timing chain is excessive.

The first reaction force F1 (FIG. 4) is a reaction force that occurs when the timing chain tension is not excessive, and the second reaction force F2 (FIG. 5) generated when timing chain tension becomes excessive, is greater than the first reaction force. If second force component f2 is greater than the resultant of the biasing force Fs and sliding direction component of the frictional force acting between the ratchet teeth and the rack teeth, the ratchet element 150 slides in the disengaging direction, and the ratchet teeth 151 disengage the rack teeth 122, as shown in FIG. 6.

Figure 7:
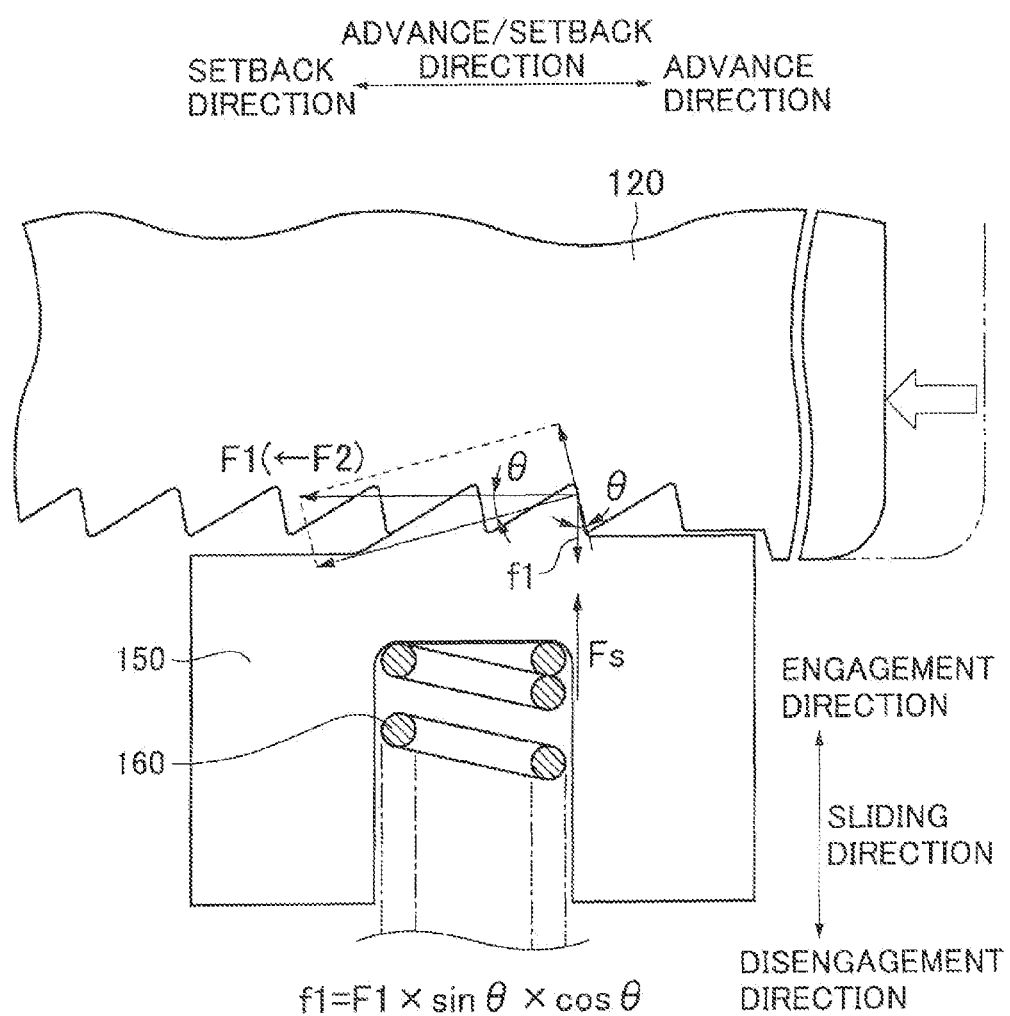
FIG. 7 is a schematic diagram showing the engagement of rack teeth on the plunger with ratchet teeth after the ratchet teeth disengage the rack teeth with which they were previously engaged in FIGS. 5 and 6 and engage rack teeth adjacent the rack teeth with which they were previously engaged.

The plunger 120 is then set back by a distance corresponding to one or more rack teeth 122 until the reaction force F returns to a magnitude F1, and a first component force f1 acts on the ratchet element 150 as shown in FIG. 7.

From FIGS. 4-7, it can be seen that the tensioner limits setback of plunger 120 to a distance corresponding to the plunger backlash distance during engine start-up and during normal engine operation, but allows additional setback in the event that chain tension become excessive during engine operation. The biasing force exerted by the plunger-biasing spring 130 may be greater than the biasing force Fs exerted by the ratchet-biasing spring 160. By adjusting the biasing force Fs, it is possible to adjust the level of the excessive chain tension at which disengagement of the ratchet teeth from the rack teeth of the plunger occurs.

As shown in FIGS. 3-5, the rack teeth 122 are formed with inclined stop surfaces 122a that face rearward and outward from the plunger. That is, when proceeding in the disengagement direction of the of the ratchet element 150, surfaces 122a are inclined in the advancing direction of the plunger. The rack teeth are also formed with forward and outward-facing sliding surfaces 122b, which, when proceeding in the disengagement direction of the of the ratchet element 150, are inclined in the setback direction of the plunger.

The ratchet teeth 151 are formed with forward and outward-facing counterface surfaces 151a, which are inclined in the advancing direction of the plunger when proceeding in the disengaging direction of the ratchet element 150. The ratchet teeth are also formed with rearward and outward-facing, sliding counterface surfaces 151b, which are inclined in the setback direction of the plunger when proceeding in the disengaging direction of the ratchet element 150.

The inclination angle $\theta$ of the stopping surfaces 122a (FIGS. 2B, 4 and 5) is smaller than the inclination angle $\alpha$ of the sliding surface 122b (FIGS. 2B and 3).

The inclination angle $\theta$ is determined experimentally by simulation so that disengagement of ratchet teeth 151 from the rack teeth 122 and resulting setback of the plunger 120 are prevented when the reaction force F is in a low range including magnitude E1, but disengagement of ratchet teeth 151 from the rack teeth 122 and resulting setback of the plunger 120 are allowed when the reaction force is in a higher range including magnitude F2.

The inclination angle $\alpha$ is also determined experimentally by simulation so that disengagement of the ratchet teeth 151 from the rack teeth 122 and advancing movement of the plunger 120 are allowed when the advancing force Fa (FIG. 3) acts on the plunger 120.

When the plunger 120 advances to apply tension to the timing chain C during operation of the engine as shown in FIG. 3, the relationship of the magnitudes of the force component fa in the sliding direction generated by the advancing force Fa and the biasing force Es of the ratchet element 150 is:

$$fa = Fa \times \cos \alpha \times \sin \alpha$$

$$fa > Fs$$

When the setback of the plunger 120 is blocked on starting of the engine, for example as shown in FIG. 4, the relationship of magnitudes of the first component force f1 and the biasing force Fs of the ratchet element 150 is:

$$f1 = F1 \times \cos \theta \times \sin \theta$$

$$f1 < Fs$$

When the plunger 120 advances excessively due to temperature changes in the engine, as shown in FIG. 5, and the timing chain C is under excessive tension so that setback of the plunger 120 is allowed, the relationship of magnitudes of the second component force f2 generated and the biasing force Fs is:

$$f2 = F2 \times \cos \theta \times \sin \theta$$

$$f2 > Fs$$

When the second reaction force F2, that results in setback of the plunger 120, is generated by the timing chain C when it tension becomes excessive, this second reaction force F2 acts on the stop counterface surfaces 151a through the stop surfaces 122a, causing the second component force f2 to act on the ratchet element so that the ratchet teeth 151 disengage the rack teeth 122. As shown in FIGS. 6 and 7, the rack teeth 122 slide on the slide counterface surfaces 151b, allowing the plunger to set back through a distance corresponding to the rack tooth pitch or an integral multiple thereof.

As shown in FIGS. 9 and 10, the ratchet element-receiving hole 113 in the housing 110 has an inner circumferential surface 115. The inner circumferential surface 115 guides the ratchet element 150 for sliding movement in the sliding direction by sliding contact with the outer circumferential surface 153 of the ratchet element 150.

As shown in FIG. 2B, The axial length Nh of the inner circumferential surface 115 is greater than the axial length Nr of the outer circumferential surface 153 of the ratchet element 150. In FIGS. 9 and 10, a small radial gap g between the inner circumferential surface 115 of hole 113 and the outer circumferential surface 153 of the ratchet element 150 is needed to make the ratchet element slidable in the ratchet receiving hole 113. The size of this gap g is exaggerated in FIGS. 9 and 10 for the purpose of explanation.

Since the biasing force Fs, exerted by the ratchet-biasing spring 160, is greater than the first force component f1 when the plunger 120 is pressed in the setback direction by the first reaction force F1 (FIG. 4), the ratchet element 150 is pressed by the plunger 120 in the setback direction against the setback direction-side 115b of the inner circumferential surface 115 of hole 113 as shown in FIG. 9. The center line Lr of the ratchet element 150 remains parallel with the center line Lh of the inner circumferential surface 115 of hole 113. At this time, the outer circumferential surface 153 is not in contact with an advance direction-side part 115a of the inner circumferential surface 115.

When the plunger 120 advances, the ratchet element 150 is pressed by the plunger 120 in the advancing direction against the advance direction side 115a of the inner circumferential surface 115, and the outer circumferential surface 153 of the ratchet element 150 is in sliding contact with the inner circumferential surface 115 of the ratchet-receiving hole 113 as the ratchet element 150 moves both in the disengaging direction and in the engaging direction.

On the other hand, when the plunger is pressed in the setback direction by a greater force F2 when chain tension becomes excessive. Here, as shown also in FIG. 10, the outer circumferential surface 153 contacts the setback direction side 115b of the inner circumferential surface 115 on the plunger-side end 153a, but contacts the advance direction side 115a on the non-plunger-side end 153b. As a result, the ratchet element tends to become inclined relative to its sliding direction. The ratchet element is therefore provided with a projection 180 (FIGS. 8-10), which serves as an inclination-suppressing structure for preventing skewed contact of the outer circumferential surface 153 of the ratchet element with the inner circumferential surface 115 of the ratchet-receiving hole.

The projection 180 is disposed on the ratchet element 150 on the advance-direction side of the front ratchet tooth 151A, and is capable of abutment with a tooth tip 123 of rack tooth 122A, which is located on the advance-direction side of the front ratchet tooth 151A. The rack tooth 122A is located forward, i.e., on the advance-direction side, of the rack tooth 122 that is in engagement with the front-end ratchet tooth 151A.

Figure 8:
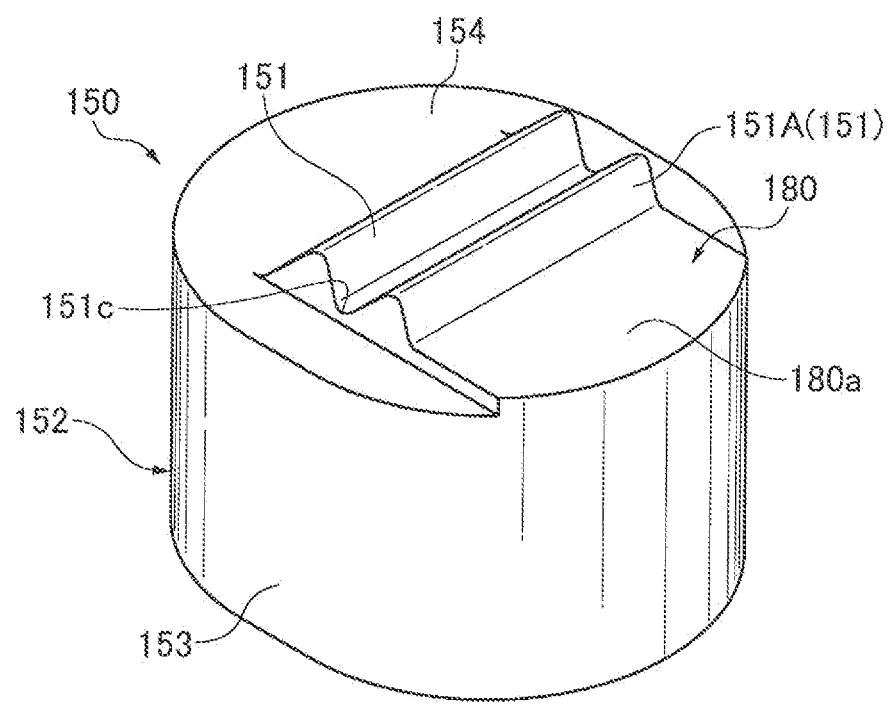
FIG. 8 is a perspective view of the ratchet element of the tensioner shown in FIGS. 2A-7.

The projection 180 projects in the engaging direction from a plunger-side end surface 154 of the ratchet element, and has its width is approximately equal to the widths of the ratchet teeth 151 as shown in FIG. 8. The top face 180a of the projection 180 is in the form of a plane orthogonal to the axial center line Lr of the ratchet element (FIGS. 9 and 10), and its length, measured in the advance/setback direction of the plunger is greater than the pitch of the rack teeth 122. The top face 180a extends substantially the entire distance from the front ratchet tooth 151A to the upper edge of the outer circumferential surface of the ratchet element.

A minute space E exists between the rack tooth 122A and the tooth tip 123 as shown in FIG. 9 when the center line of the ratchet element 150 is parallel to the center line of the ratchet-receiving hole 113. When the ratchet teeth 151 are in engagement with the rack teeth 122, and when the ratchet element 150 is pressed in the setback direction by the plunger 120 as a result of the second reaction force F2, the ratchet element is in a condition in which it is just starting to incline.

When the ratchet element 150 inclines in the setback direction, the top surface 180a of the projection 180 abuts the tooth tip 123, thus preventing the ratchet element 150 from inclining further, so that the edge 153b of the non-plunger side end does not engage the advance direction-side part 115a of the ratchet-receiving hole. At this time, a position P (FIG. 10), where the projection 180 abuts the tooth tip 123, is located on the advance direction-side with respect to the axial center line Lr of the ratchet element 150, and tooth tip 123 moves in the setback direction on the top surface 180a while the ratchet element 150 slides in the disengaging direction as the plunger 120 sets back. Within a range in which contact is maintained between the top surface 180a and the tooth tip 123 as the plunger sets back, the ratchet element 150 slides in the disengagement direction while being prevented from inclining so much that its upper and lower edges contact opposite sides of the ratchet-receiving hole.

Because the top surface 180a abuts the tooth tip 123 at position P, it becomes possible to prevent the non-plunger-side end 153b of the outer circumferential surface 153 of the ratchet element 150 from contacting the advance direction-side part 115a of the inner circumferential surface 115. It also becomes possible to prevent the plunger-side end part 153a of the outer circumferential surface 153 of the ratchet element from contacting the setback direction-side part 115b of the inner circumferential surface 115 while the non-plunger-side end 153b of the outer circumferential surface 153 contacts the advance direction-side part 115a. Thus, the ratchet element 150 is prevented from being put into an inclined condition in which its plunger side end contacts surface 115 on the setback side, while its non-plunger side end contacts surface on the advance side.

The inclination suppressing effect and the sliding range both become greater when the abutting position P is farther from the front-end ratchet tooth 151A and when the gap E is smaller. Although the projection 180 is formed as a unitary part of the ratchet element 150 in the embodiment described, as an alternative, the projection 180 can be in the form of a member formed separately from, but integrated with, the ratchet element 150.

When the axial center line Lr is in parallel with the sliding direction, the rack teeth 122 are in mesh with the ratchet teeth 151 as shown in FIG. 9. Then, when the projection of the ratchet element 150 is at a maximum in the engagement direction, H is the height of the projection 180, measured between the plunger-side end surface 154 of the ratchet element 150 and the top surface 180a of projection 180 along the direction of the center line, or the sliding direction. T is the tooth depth of the rack teeth 122. B is the gap between a tooth bottom 122c of the rack teeth 122 and the plunger-side end surface 154 in the direction of the axial center line or sliding direction. D is the distance between a tooth bottom 151c of the ratchet teeth 151 and the plunger-side end surface 154 in the direction of the axial center axial line or sliding direction. These parameters H, T, B and D are set to satisfy the following relationships:

$$H < B - T$$

$$H > D$$

When the projection of the ratchet element 150 is at a maximum in the engagement direction and H<B−T, the gap E exists between the tooth tip 123 and the top surface 180a just before the ratchet element begins to incline. When H>D, it is only necessary to bring the projection 180 into abutment with the tooth tip 123, and not necessary to abut a tooth bottom 151c of the ratchet teeth 151 with a tooth tip 123 of the rack teeth 122 to suppress the inclination of the ratchet element 150 caused by setting back movement of the plunger 120. The axial center line Lr of the ratchet element remains parallel with the axial center line Lh of the ratchet-receiving hole.

The disengagement of the rack teeth 122 from the ratchet teeth 151 when tension of the timing chain C becomes excessive will be explained with reference to FIGS. 1, 5-7 and 10.

The two-dot chain lines in FIGS. 6 and 7 show the position of the front end of the plunger 120 and the position of the ratchet element 150 when the timing chain C is under excessive tension after starting the engine. The second reaction force F2, that sets back the plunger 120 when the tension in the timing chain C is excessive after starting the engine, produces a second component force f2 in the sliding direction as shown in FIG. 6. When the second component force f2 acts on the ratchet element 150, the plunger 120 starts to set back as the stop surfaces 122a (FIG. 5) slide on the counterface surfaces 151a (FIG. 5). Then, the ratchet element 150 is pressed against the inner circumferential surface 115 in the setback direction tends to become inclined as shown in FIG. 10.

Then, as the plunger 120 sets back, the ratchet element 150 slides in the disengaging direction while being prevented from inclining. The setback side of its plunger side end and the advance side of its non-plunger end are prevented from simultaneously contacting opposite sides of the inner circumferential surface of hole 113. Inclination of the ratchet element is prevented throughout the range in which the top surface 180a and the tooth tip 123 are in abutting relationship. Ultimately, the rack teeth 122 of the plunger 120 disengage the ratchet teeth 151 of the ratchet element 150.

When the rack teeth 122 are disengaged from the ratchet teeth 151, the ratchet element 150, biased by the ratchet-biasing spring 160, slides in the engaging direction and the sliding surface 122b (FIG. 5) start to slide over the sliding counterface surface 151b (FIG. 5). The ratchet element 150 again slides in the engaging direction while its outer circumferential surface 153 is in contact with the inner circumferential surface 115, and the plunger 120 continues to set back.

As the plunger 120 continues to set back, the stopping surface 122a of a next succeeding rack tooth 122 abuts the stop counterface surface 151a (FIG. 5) as shown in FIG. 7. If the second reaction force F2 continues to act on the plunger 120, the plunger 120 is allowed to set back in the same manner by the operations described above.

As the plunger 120 sets back by one or several rack teeth 122, it become possible to eliminate excessive projection of the plunger 120, and eliminate excessive tension in the timing chain C.

Next, the operations and effects of the embodiment configured as described above will be explained.

As described above, the ratchet mechanism R of the ratchet-type tensioner 100 comprises the ratchet-receiving hole 113 in the housing 110, the ratchet element 150, slidable in the ratchet-receiving hole 113, the ratchet teeth 151 engageable with rack teeth 122 on the plunger 120, and the ratchet-biasing spring 160 for biasing the ratchet element 150 in the engaging direction.

The ratchet mechanism R allows the plunger 120 to set back when the reaction force F acting on the plunger 120 from the timing chain C is the second reaction force F2 generated when the tension in the timing chain C is excessive.

The ratchet-receiving hole 113 of the housing 110 has an inner circumferential guide surface 115 for guiding the ratchet element 150 in the sliding direction by slidably contact with the outer circumferential surface 153 of the ratchet element 150.

The ratchet-type tensioner 100 further comprises the projection 180, serves as the inclination-suppressing structure for preventing skewed contact between the ratchet element and the ratchet-receiving hole. The projection 180 prevents the outer circumferential surface 153 of the ratchet element from being put into an inclined condition in which one of its ends contacts one side of the ratchet-receiving hole while its opposite end contacts the other side of the hole, a condition in which sliding of the ratchet element is impaired. As a result, the ratchet element 150 can slide smoothly in the disengaging direction on the inner circumferential surface 115 of the ratchet-receiving hole, and the slidability of the ratchet element 150 in the disengaging direction is improved.

The prevention of inclination of the ratchet element to the extent that its opposite ends contact opposite sides of the ratchet-receiving hole is brought about when the ratchet element 150 is in a stationary state before it starts to slide in the disengaging direction, and immediately after the plunger 120 starts to press the ratchet element 150 in the setback direction. Consequently the inclination suppressing structure can reduce static friction acting on the ratchet element 150.

As a result, the ratchet teeth 151, can quickly disengage the rack teeth 122, the plunger 120 can be set back quickly, and excessive tension in the timing chain C can be relieved quickly, so that it becomes possible to reduce both the load on the timing chain, and noise caused by excessive tension.

Because the inclination suppressing structure is constituted by the projection 180 provided on the ratchet element 150 for abutment with the plunger 120, the inclination suppressing structure can be realized in a very simple structure.

The position P, at which the projection 180 abuts the tip 123 of a rack tooth 122, is located on the advance-direction side of the axial center line Lr of the ratchet element 150 and on the advance-direction side of the front ratchet tooth 151A. Therefore, it is possible to increase the inclination suppressing sliding range, i.e., the sliding range of the ratchet element 150 that brings about the effect of preventing inclination such that edges of the two ends of the ratchet element are in contact with opposite sides of the ratchet-receiving hole. The increased sliding range also contributes to the ability of the plunger 120 to set back more quickly, to rapid relief of excessive tension in the timing chain C, reduction of the load on the timing chain C and reduction of noise. caused by excessive tension.

Because suppression of inclination of the ratchet element is brought about by abutment of the projection 180 with a tooth tip 123 of a rack tooth 122A, it is possible to suppress the inclination of the ratchet element 150 with a very simple structure, utilizing the rack tooth as one of the abutting elements.

Because the height H of the projection 180, the tooth depth T of the rack teeth 122, and the distance B between the tooth bottom 122c and the plunger-side end surface 154, satisfy the relationship $H<B-T$, a gap E is created in the sliding direction between the tooth tip 123 and the projection 180 when the ratchet element 150 is located at its maximum position in the engagement direction. Therefore, it is possible to prevent the projection 180 from hampering the movement of the plunger 120 in the advance/setback direction. As a result, in a tensioner having a projection 180 on the plunger-side end surface 154 of the ratchet element 150, it is possible to improve the rapidity of the setback of the plunger 120 by the inclination suppressing effect brought about by the projection 180, while assuring good mobility of the plunger 120 in the advance/setback direction.

Because the height H of the projection 180 and the distance D between the tooth bottom 151c and the plunger-side end surface 154 satisfy the relationship $H>D$, it is not necessary for the tooth bottom 151c of the ratchet element 150 to abut the tooth tip of the rack teeth 122 to suppress the inclination of the ratchet element 150, and it is possible to prevent wear the tooth bottom 151c of the ratchet teeth 151 and the tooth tip of the rack teeth 122 that would otherwise be caused by their abutment. When the width of the top surface 180a of the projection 180 approximates the width of the front ratchet tooth 151A, the at the abutment position P can take place over a large widthwise distance, i.e., a distance in the direction of the tooth width of the ratchet teeth 151 and the rack teeth 122. Therefore, it becomes possible to prevent the ratchet element from rocking when in the abutting condition, and thereby improve the sliding of the ratchet element 150 in the disengaging direction.

The plunger 120 advances by being biased by the plunger-biasing spring 130 and hydraulic pressure within the high-pressure oil chamber to which oil is supplied under pressure as the engine is operated. The biasing force Fs of the ratchet-biasing spring 160 is set so that it is greater than the first component force f1 generated on starting the engine, but smaller than the second component force f2 generated when the tension of the timing chain C becomes excessive after starting the engine. With this arrangement, it is possible to reduce flapping noises from the timing chain by suppressing the setback displacement of the plunger 120 on starting the engine when the hydraulic pressure within the high-pressure oil chamber 131 is not enough to overcome the first reaction force F1. It is also possible to prevent seizing of the plunger 120 by allowing setback displacement of the plunger 120 when the tension of the timing chain C is excessive after starting the engine. This arrangement requires no special plunger-biasing spring to accommodate a high-load, and allows the tensioner to be downsized by reducing the number of its parts and its production costs.

The rack teeth 122 of the plunger 120 are in concave/convex form, having stop surfaces 122a inclined toward the advance-direction proceeding in the disengaging direction, and sliding surfaces 122b inclined toward the setback-direction proceeding in the disengaging direction. The ratchet teeth 151 of the ratchet element 150 are similarly in concave/convex form, having stop counterface surfaces 151a inclined toward the advance-direction proceeding in the disengaging direction, and sliding counterface surfaces 151b inclined toward the setback-direction proceeding in the disengaging direction. The inclination angle θ of the stop surface 122a is formed to be smaller than the inclination angle α of the sliding surface 122b.

With this arrangement, it becomes possible to allow smooth setback displacement without restricting the movement of the plunger 120 in the setback direction while preventing wear and damage such as the chipping of ratchet teeth and rack teeth that can occur when the tension of the timing chain C is excessive after starting the engine. It also becomes possible to realize significantly improved durability by avoiding excessive impact on the ratchet biasing spring 160.

Modified examples of the ratchet-type tensioner described above are shown in FIGS. 11, 12A, 12B, 13A, 13B and 14. The ratchet-type tensioner of the modified examples have basically the same structure as the tensioner described above, except for the specific inclination suppressing structure. Parts in the modified examples are denoted by the same reference numerals as used to designate corresponding parts in the above-described embodiment.

Figure 11:
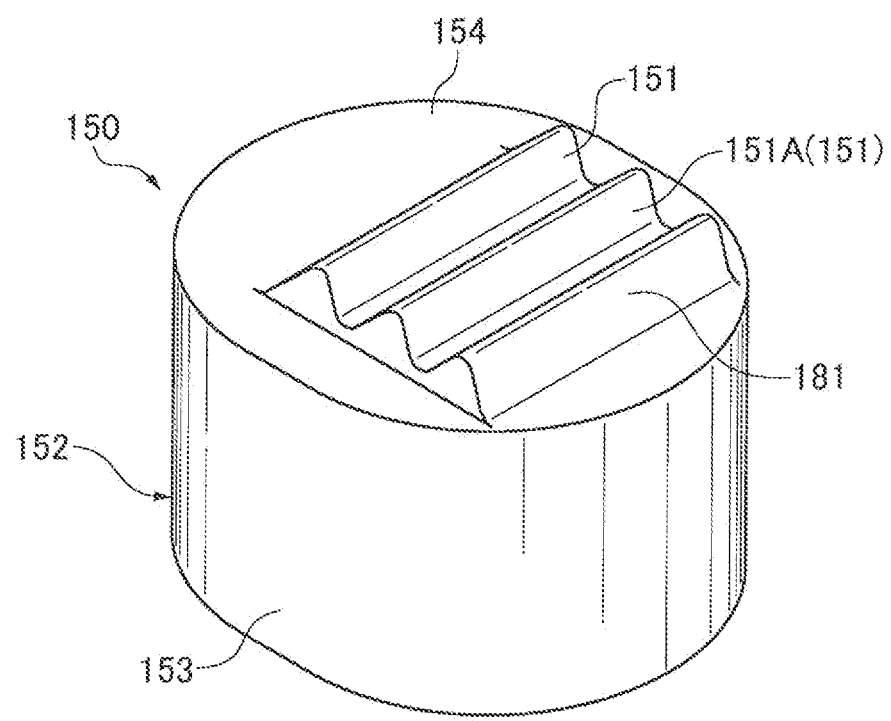
FIG. 11 is a perspective view of a ratchet element of the tensioner according to a first modification of the embodiment described above.
Figure 12A:
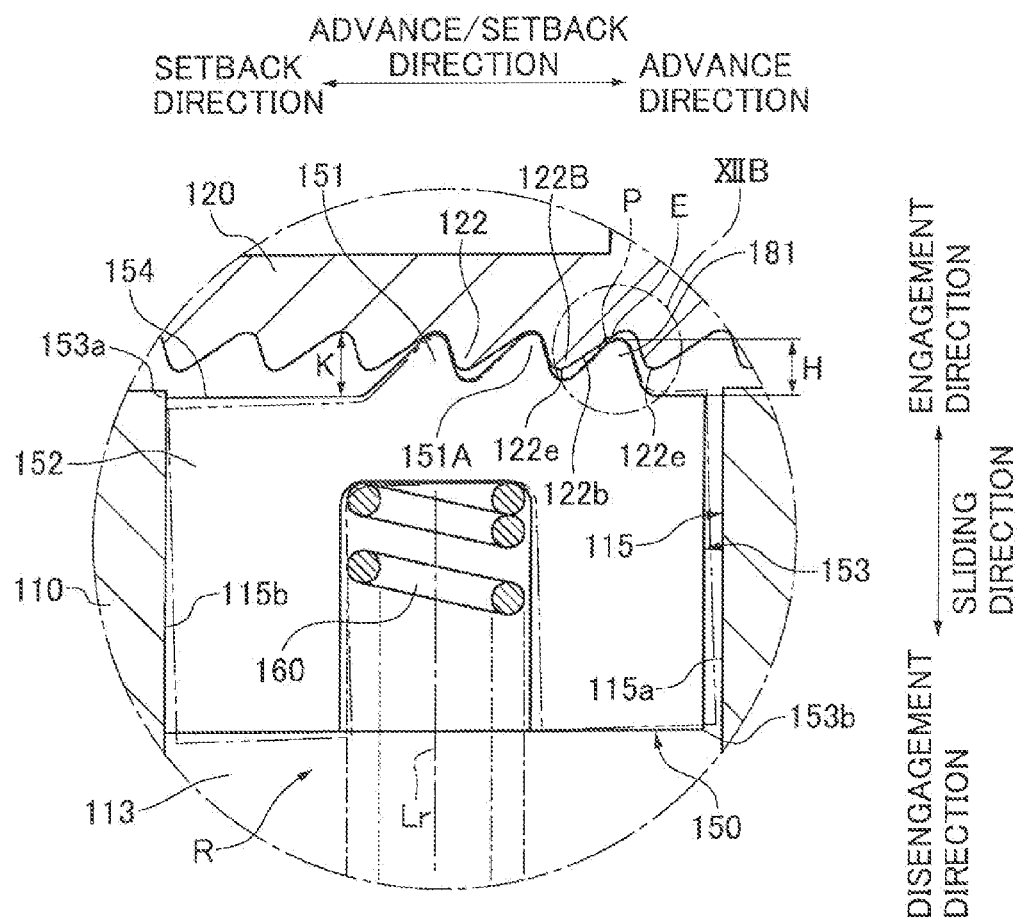
FIG. 12A is a sectional view corresponding to FIG. 9, but in which the ratchet element is the modified ratchet element shown in FIG. 11.
Figure 12B:
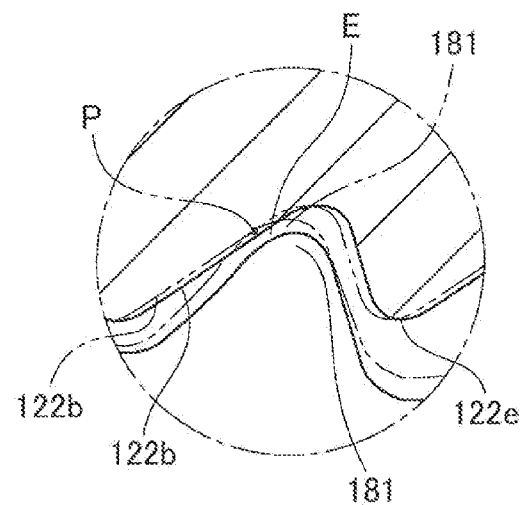
FIG. 12B is an enlarged auxiliary view of a part of the tensioner surrounded by a broken line circle in FIG. 12A, showing details of the abutment of the rack teeth with the ratchet teeth.

As shown in FIG. 11, in a first modified example, a projection 181 is disposed on the advance-direction side of the front ratchet tooth 151A on the plunger-side end surface 154 of the ratchet element 150, as shown in FIGS. 12A and 12B. Projection 181, which serves as the inclination suppressing structure, can abut a rack tooth 122B located on the advance-direction side of the front ratchet tooth 151A. The specific rack tooth 122B is the rack tooth engaged with the front ratchet tooth 151A.

The projection 181 is a saw tooth-like projection resembling the ratchet teeth 151, extends in the tooth width direction of the ratchet teeth 151 along the front ratchet tooth 151A, and is arranged so that it can abut the sliding surface 122b, which is the tooth surface on the advance-direction side of rack tooth 122B.

The height H of the projection 181, measured perpendicularly from the plane of the plunger-side end surface 154 of the ratchet element 150 along the axial center line, is lower than the height K of the ratchet teeth 151, and the projection 181 is not in contact with rack tooth 122B when the ratchet member is about to begin to incline.

This arrangement prevents the projection 181 from hampering movement of the plunger 120 in the advance/setback direction, so that it becomes possible to improve rapidity of the setback of the plunger 120 by the inclination suppressing effect brought about by the projection 181, while ensuring good mobility of the plunger 120 in the advance/setback direction.

The projection 181 extends in the engaging direction beyond the tooth tip 122e just before the ratchet element can begin to incline, and there is a minute gap E between the sliding surface 122b and the projection 181 both in the sliding direction and in the advance/setback direction.

When the ratchet element 150 begins to incline, as shown by two-dot chain lines in FIGS. 12A and 12B, the projection 181 abuts the sliding surface 122b, and the ratchet element 150 is prevented from inclining further. At this time, the position P where the projection 181 abuts the rack tooth 122B is located on the advance-direction side of the axial center line Lr and on the advance direction side of the front ratchet tooth 151A.

As the projection 181 abuts the sliding surface 122b at the abutment position P, it becomes possible to prevent the outer circumferential surface 153 from contacting the advance direction-side part 115a of the inner circumferential surface 115 on the non-plunger-side end 153b of the ratchet element, and to prevent the ratchet element 150 from being put into an inclined state in which both sides contact the inner circumferential surface 115 of the ratchet-receiving hole 113.

When the ratchet element 150 slides in the disengaging direction as the plunger 120 sets back, the abutment position P moves on the sliding surface 122b in the setback direction and disengaging direction. Therefore, it is possible to maintain the inclination suppressing effect and to increase the inclination suppressing sliding range through which the abutment position P moves on the sliding surface 122b. Thus, the first modified example brings about effects similar to those achieved by the first embodiment.

Figure 13A:
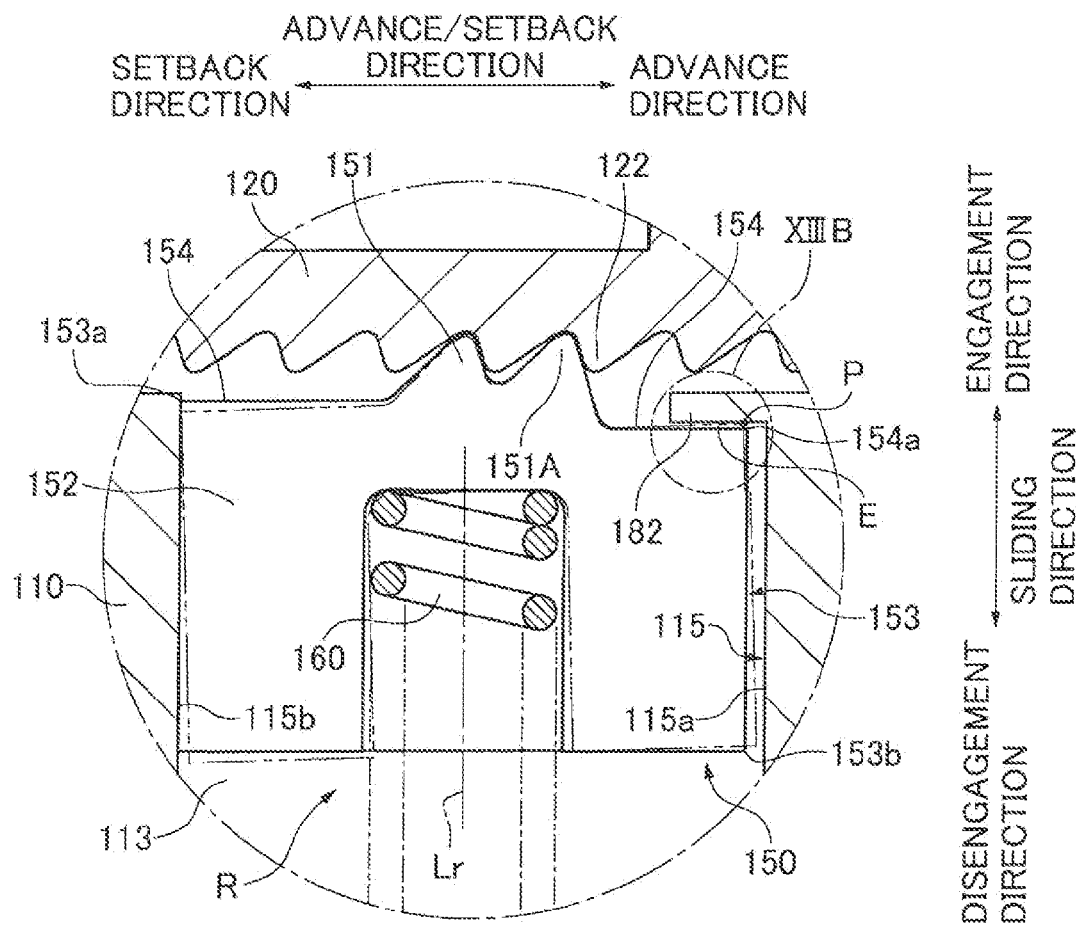
FIG. 13A is a sectional view corresponding to FIGS. 9 and 11, but in which the ratchet element is another modification of the ratchet elements shown in FIGS. 9 and 11.
Figure 13B:
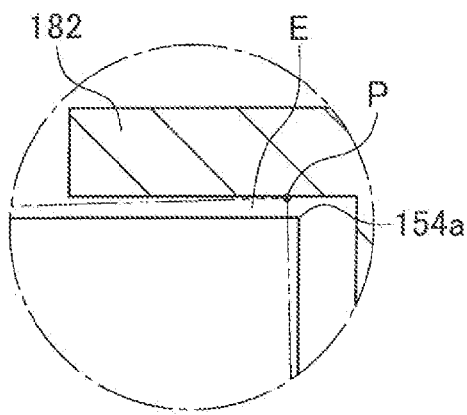
FIG. 13B is an enlarged auxiliary view of a part of the tensioner surrounded by a broken line circle in FIG. 13A.

As shown in FIGS. 13A and 13B, a projection 182 of the tensioner housing 110, which serves as a stop, composes the inclination suppressing structure of a second modified example. The projection 182 is disposed on the advance-direction side of the front ratchet tooth 151A. The projection 182 is a plate-like part disposed at the advance direction-side end of the ratchet-receiving hole 113, projecting radially inward toward the axial center line Lr from the inner circumferential surface 115. The projection 182 is positioned to be abutted by the plunger-side end surface 154 on the advance-direction side of the ratchet element 150.

The projection 182 is disposed within the ratchet-receiving hole 113, so that the projection 182 is prevented from hampering the movement of the plunger 120 in the advance/setback direction. Therefore, it becomes possible to improve the rapidity of the setback of the plunger 120 by the inclination suppressing effect brought about by the projection 182, while ensuring the good mobility of the plunger 120 in the advance/setback direction.

Just before the ratchet element can begin to incline, there is a minute gap E in the sliding direction between the plunger-side end surface 154 and the projection 182.

When the ratchet element 150 begins to incline as the plunger 120 sets back, as shown by two-dot chain lines in FIGS. 13A and 13B, the projection 182 abuts an edge 154a of the plunger-side end surface 154 at an abutment position P, located on the advance-direction side with respect to the axial center line Lr and with respect to the front ratchet tooth 151A. Accordingly, the ratchet element 150 is prevented from being placed in an inclined condition in which it contacts both sides of the ratchet-receiving hole. Thus, this second modified example brings about operations and effects similar to those of the embodiments described above.

In modification of the first embodiment and the first and second modified examples described above, the range in which the top surface 180a of the projection 180 is formed can be smaller than the tooth width of the ratchet teeth 151 in the tooth width direction of the stop counterface surface 151, and may be smaller than the pitch of the rack teeth 122, provided that the path of movement of the abutment position P follows the top surface 180a in the advance/setback direction.

Figure 14:
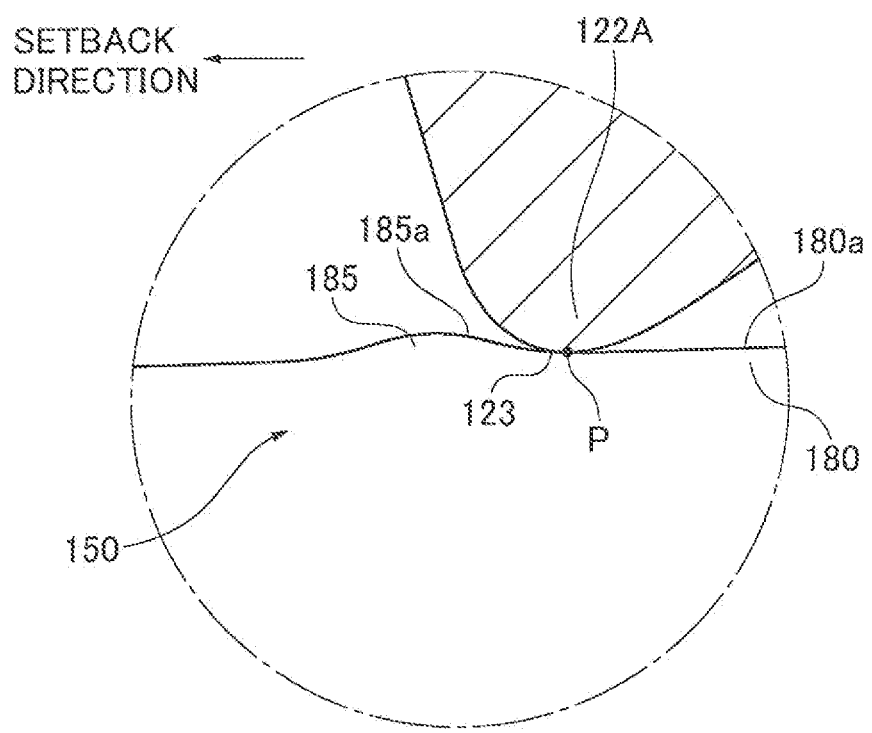
FIG. 14 is an enlarged auxiliary view corresponding to the portion of FIG. 10 designated by the broken line circle labeled XIV and illustrating a further modification.
Figure 15:
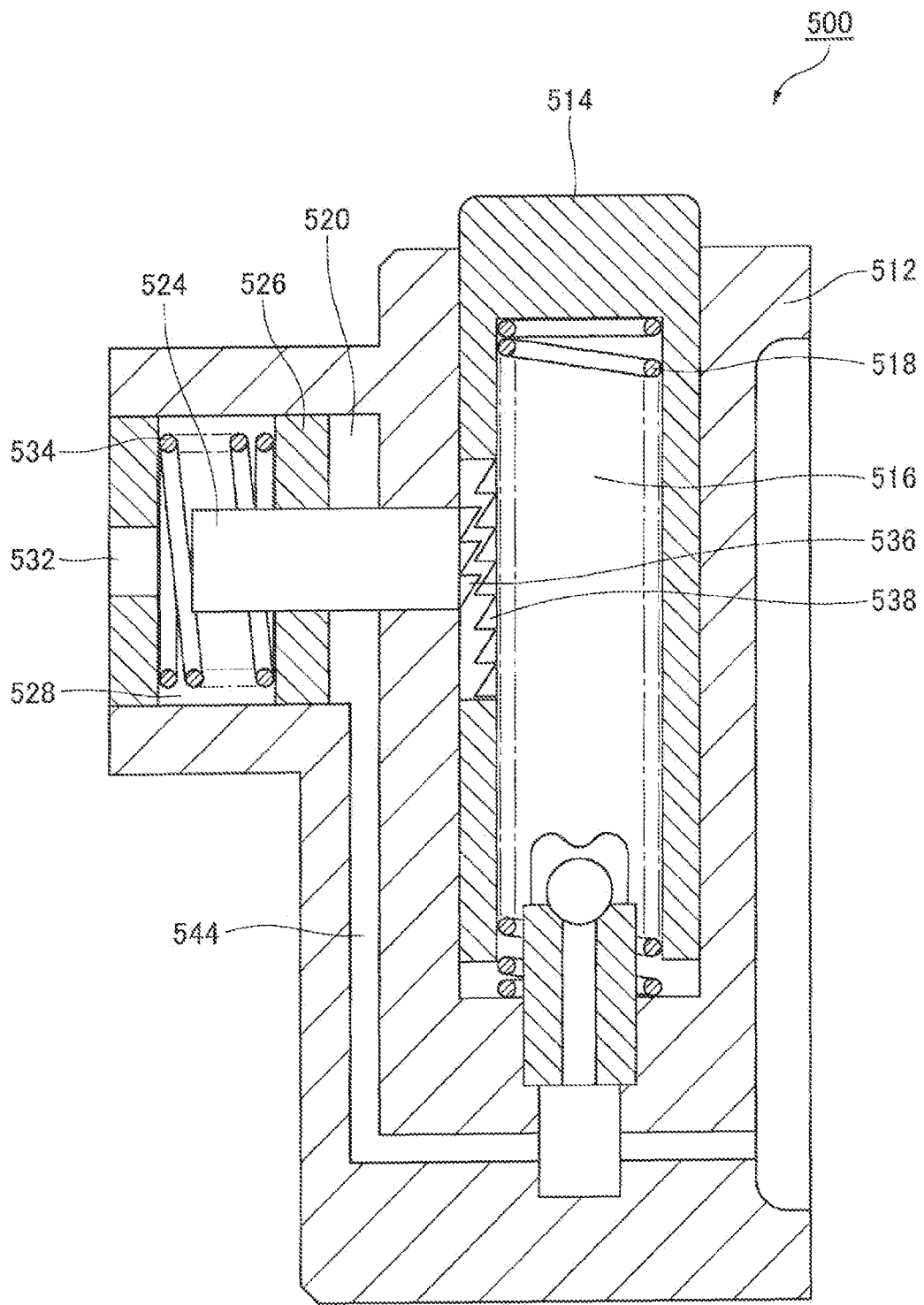
FIG. 15 is a longitudinal cross-sectional view of a prior art tensioner.

As shown in FIG. 14, which is an enlarged section view corresponding to the portion designated XIV in FIG. 10, the top surface 180a may be provided with a bulge 185 for suppressing or preventing the inclination angle of the ratchet element 150 from increasing when the abutment position P moves in the setback direction on the top surface 180a of the projection 180 of the ratchet element 150.

The bulge of the projection 180 has an inclined surface 185a that gradually projects in the engaging direction. As the abutment position P moves in the setback direction on this inclined surface 185a, it a clockwise moment is exerted on the ratchet element 150. It then becomes possible to suppress or prevent the inclination of the ratchet element 150 from increasing, and more preferably, to prevent the ratchet element 150 from being put into an inclined condition in which it contacts both sides of the ratchet-receiving hole.

The ratchet-receiving space in which the ratchet element 150 is slidable can be a space other than a hole. For example, while the ratchet element 150 in the embodiments described above is fitted into the inner circumference of a ratchet-receiving hole in the tensioner housing, as an alternative, the ratchet element 150 can be fitted around the outer circumference of a supporting portion which is a part of the housing. A guide surface can be provided on the outer circumferential surface of the supporting portion, and a sliding contact surface cooperable with the guide surface can be formed as part of an inner circumferential surface within the ratchet element.

The advance/setback direction of the plunger is also not necessarily orthogonal to the sliding direction of the ratchet element.

The transmission medium can be a chain or a belt, other than the timing chain of the engine, and may be provided in a transmission an any of various machines other than an engine.

What is claimed is:

1. A ratchet-type tensioner comprising:
a housing;
a plunger supported by the housing for movement in an advance/setback direction, the plunger having rack teeth provided thereon and arranged to advance with respect to the housing along the advance/setback direction for applying tension to a traveling transmission medium engaged with rotating members, said rack teeth having tooth bottoms and a tooth depth T; and
a ratchet mechanism capable of restricting the plunger from setting back due to a reaction force acting in a setback direction from the transmission medium;
said ratchet mechanism comprising:
a ratchet-receiving hole provided within the housing;
a ratchet element slidable in the ratchet-receiving hole and movable in a sliding direction transverse to the advance/setback direction;
ratchet teeth on the ratchet element engageable with the rack teeth of the plunger, said ratchet teeth having tooth bottoms; and
a ratchet-biasing spring for biasing the ratchet element in an engaging direction along the sliding direction so that the ratchet teeth engage with the rack teeth;
said ratchet mechanism restricting the plunger from setting back by engaging the ratchet teeth with the rack teeth when the reaction force is a first reaction force generated when the tension of the transmission medium is smaller than a predetermined excessive tension; and
said ratchet mechanism allowing the plunger to set back by sliding the ratchet element in a disengaging direction to disengage the ratchet teeth from the rack teeth when the reaction force is a second reaction force generated when the tension of the transmission medium at least as great as said predetermined excessive tension;
said ratchet-receiving hole having a guide surface for guiding the ratchet element in the sliding direction by sliding contact with a sliding surface of the ratchet element, said guide surface having an advance direction side part facing in the setback direction of the plunger;
said ratchet mechanism further comprising an inclination suppressing structure for preventing said sliding surface of the ratchet element from contacting the advance direction-side part of the guide surface when the ratchet element is pressed by the plunger in the setting back direction due to said second reaction force;
said inclination suppressing structure being a stop provided either on the ratchet element or on a member other than the ratchet element, said stop, if on said ratchet element, being located for abutment with said member other than the ratchet element at an abutment position, and said stop, if on said member other than said ratchet element being located for abutment with said ratchet element at an abutment position, and each said abutment position being located on the side of an axial center line of the ratchet element facing in the advancing direction of the plunger, and on a side of the ratchet tooth of the ratchet element which is the frontmost tooth thereof with reference to the advancing direction of the plunger, said side of the ratchet tooth facing in the advancing direction of the plunger; and
said stop is a projection having a height H on the ratchet element that is positioned for abutment with a tip or a tooth surface of a rack tooth, said height H being measured, along said sliding direction of the ratchet element, between the plunger-side end surface of the ratchet element and the abutment position;
wherein a gap B exists between the tooth bottoms of the rack teeth and the plunger-side end surface of the ratchet element, and the height H of the projection, the tooth depth T of the rack teeth and said gap B are related by H<B−T.

2. The ratchet-type tensioner according to claim 1, wherein said tooth bottoms of the ratchet teeth are at a distance D, measured in said sliding direction, from the plunger side end surface of the ratchet element, and wherein said height H of the projection and said distance D are related by H>D.

* * * * *